United States Patent
Baldemair et al.

(10) Patent No.: US 9,191,162 B2
(45) Date of Patent: *Nov. 17, 2015

(54) SIMULTANEOUS REPORTING OF ACK/NACK AND CHANNEL-STATE INFORMATION USING PUCCH FORMAT 3 RESOURCES

(71) Applicant: Telefonaktiebolaget L M Ericsson (publ), Stockholm (SE)

(72) Inventors: Robert Baldemair, Solna (SE); Jung-Fu Cheng, Fremont, CA (US); Mattias Frenne, Uppsala (SE); Daniel Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,880

(22) Filed: Aug. 14, 2014

(65) Prior Publication Data
US 2015/0016389 A1    Jan. 15, 2015

Related U.S. Application Data

(63) Continuation of application No. 13/499,773, filed as application No. PCT/SE2012/050152 on Feb. 14, 2012, now Pat. No. 8,837,410.

(60) Provisional application No. 61/542,503, filed on Oct. 3, 2011.

(51) Int. Cl.
*H04L 1/18* (2006.01)
*H04W 72/04* (2009.01)
(Continued)

(52) U.S. Cl.
CPC ............ *H04L 1/1861* (2013.01); *H04L 1/1671* (2013.01); *H04W 72/0406* (2013.01); *H04L 1/0026* (2013.01)

(58) Field of Classification Search
None
See application file for complete search history.

(56) References Cited

U.S. PATENT DOCUMENTS

2009/0274100 A1* 11/2009 Montojo et al. ............... 370/328
2010/0124291 A1*  5/2010 Muharemovic et al. ...... 375/260
(Continued)

FOREIGN PATENT DOCUMENTS

WO    2013051981 A1    4/2013

OTHER PUBLICATIONS

Interdigital, Performance of CQI and A/N multiplexed on PUCCH, R1-105948, Nov. 15-19, 2010.*
(Continued)

*Primary Examiner* — Hassan Kizou
*Assistant Examiner* — Tejis Daya
(74) *Attorney, Agent, or Firm* — Murphy, Bilak & Homiller, PLLC

(57) ABSTRACT

A new uplink control channel capability is introduced to enable a mobile terminal to simultaneously report multiple packet receipt status bits and channel-condition bits. In an example embodiment implemented in a mobile terminal the mobile terminal (first determines that channel-state information and hybrid-ARQ ACK/NACK bits corresponding to a plurality of downlink subframes or a plurality of downlink carriers, or both, are scheduled for transmission in an uplink subframe. The mobile terminal then determines whether the number of the hybrid-ARQ ACK/NACK bits is less than or equal to a threshold number. If so, the mobile terminal transmits both the channel-state information and the hybrid-ARQ ACK/NACK bits in physical control channel resources of the first uplink subframe, on a single carrier. In some embodiments, the number of the hybrid-ARQ ACK/NACK bits considered in the previously summarized technique represents a number of ACK/NACK bits after ACK/NACK bundling.

21 Claims, 14 Drawing Sheets

(51) Int. Cl.
*H04L 1/16* (2006.01)
*H04L 1/00* (2006.01)

(56) References Cited

U.S. PATENT DOCUMENTS

| | | | |
|---|---|---|---|
| 2010/0195629 | A1 | 8/2010 | Chen et al. |
| 2010/0210256 | A1* | 8/2010 | Shen et al. ............... 455/422.1 |
| 2011/0243012 | A1* | 10/2011 | Luo et al. .................... 370/252 |
| 2011/0243066 | A1 | 10/2011 | Nayeb Nazar et al. |
| 2011/0249578 | A1 | 10/2011 | Nayeb Nazar et al. |
| 2011/0280222 | A1* | 11/2011 | Nam et al. ................... 370/335 |
| 2011/0292887 | A1 | 12/2011 | Baldemair |
| 2012/0088533 | A1* | 4/2012 | Khoshnevis et al. ......... 455/509 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211, V10.3.0, Sep. 2011.

3GPP, "3rd Generation Partnership Project; Technical Specification Group Radio Access Network; Evolved Universal Terrestrial Radio Access (E-UTRA); Multiplexing and channel coding (Release 10)", 3GPP TS 36.212, V10.3.0, Sep. 2011.

3GPP, "3rd Generation Partnership Project; Technical Specification Group Radio Access Network; Evolved Universal Terrestrial Radio Access (E-UTRA); Physical layer procedures (Release 10)." 3GPP TS 36.213, V10.3.0, Sep. 2011.

Unknown, Author, "Evaluation of PUCCH Proposals for Carrier Aggregation", 3GPP TSG-RAN WG1 #61bis, R1-103507, Dresden, Germany, Jun. 28-Jul. 2, 2010.

Unknown, Author, "Further Details on Slow Codebook Adaptation for PUCCH Format 3", 3GPP TSG-RAN WG1 #62bis, R1-105312, Xi'an, China, Oct. 11-15, 2010.

Unknown, Author, "Mapping Tables for Format 1b with Channel Selection", 3GPP TSG-RAN WG1 #62bis, R1-105476, Xi'an, China, Oct. 11-15, 2010.

Unknown, Author, "Multiplexing of Periodic CSI and ACK/NACK on PUCCH", 3GPP TSG-RAN WG1 #63bis, R1-110164, Dublin, Ireland, Jan. 17-21, 2011.

Unknown, Author, "PUCCH Power Control for DL CA", 3GPP TSG-RAN WG1 #62bis, R1-105367, Xian, China, Oct. 11-15, 2010.

Unknown, Author, "Report of 3GPP TSG RAN WG2 Meeting #69", TSG-RAN Working Group 2 meeting #69, R2-101978, Beijing, China, Apr. 12-16, 2010.

Unknown, Author, "Way Forward on A/N Mapping Table for Channel Selection", 3GPP TSG-RAN WG1 #62bis, R1-105807, Xi'an, China, Oct. 11-15, 2010.

\* cited by examiner

SIMULTANEOUS REPORTING OF ACK/NACK AND CHANNEL-STATE INFORMATION USING PUCCH FORMAT 3 RESOURCES

RELATED APPLICATIONS

This application is a continuation of U.S. patent application Ser. No. 13/499,773, filed 2 Apr. 2012, which is a national stage entry of international patent application serial no. PCT/SE12/50152, filed 14 Feb. 2012, and claims the benefit of U.S. Provisional Patent Application 61/542,503, filed 3 Oct. 2011.

TECHNICAL FIELD

The present invention relates generally to carrier aggregation in a mobile communication system and, more particularly, to an efficient use of resources for the physical uplink control channel in wireless systems using carrier aggregation.

BACKGROUND

Carrier aggregation is one of the new features recently developed by the members of the 3rd-Generation Partnership Project (3GPP) for so-called Long Term Evolution (LTE) systems, and is standardized as part of LTE Release 10, which is also known as LTE-Advanced. An earlier version of the LTE standards, LTE Release 8, supports bandwidths up to 20 MHz. In LTE-Advanced, bandwidths up to 100 MHz are supported. The very high data rates contemplated for LTE-Advanced will require an expansion of the transmission bandwidth. In order to maintain backward compatibility with LTE Release 8 mobile terminals, the available spectrum is divided into Release 8-compatible chunks called component carriers. Carrier aggregation enables bandwidth expansion beyond the limits of LTE Release 8 systems by allowing mobile terminals to transmit data over multiple component carriers, which together can cover up to 100 MHz of spectrum. Importantly, the carrier aggregation approach ensures compatibility with earlier Release 8 mobile terminals, while also ensuring efficient use of a wide carrier by making it possible for legacy mobile terminals to be scheduled in all parts of the wideband LTE-Advanced carrier.

The number of aggregated component carriers, as well as the bandwidth of the individual component carrier, may be different for uplink (UL) and downlink (DL) transmissions. A carrier configuration is referred to as "symmetric" when the number of component carriers in each of the downlink and the uplink are the same. In an asymmetric configuration, on the other hand, the numbers of component carriers differ between the downlink and uplink. The number of component carriers configured for a geographic cell area may be different from the number of component carriers seen by a given mobile terminal. A mobile terminal, for example, may support more downlink component carriers than uplink component carriers, even though the same number of uplink and downlink component carriers may be offered by the network in a particular area.

LTE systems can operate in either Frequency-Division Duplex (FDD) mode or Time-Division Duplex (TDD) mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum. TDD mode also allows for different asymmetries in terms of the amount of resources allocated for uplink and downlink transmission, respectively, by means of different downlink/uplink configurations. These differing configurations permit the shared frequency resources to be allocated to downlink and uplink use in differing proportions. Accordingly, uplink and downlink resources can be allocated asymmetrically for a given TDD carrier.

One consideration for carrier aggregation is how to transmit control signaling from the mobile terminal on the uplink to the wireless network. Uplink control signaling may include acknowledgement (ACK) and negative-acknowledgement (NACK) signaling for hybrid automatic repeat request (Hybrid ARQ, or HARQ) protocols, channel state information (CSI) and channel quality information (CQI) reporting for downlink scheduling, and scheduling requests (SRs) indicating that the mobile terminal needs uplink resources for uplink data transmissions. In the carrier aggregation context, one solution would be to transmit the uplink control information on multiple uplink component carriers associated with different downlink component carriers. However, this option is likely to result in higher mobile terminal power consumption and a dependency on specific mobile terminal capabilities. Accordingly, improved techniques are needed for managing the transmission of uplink control-channel information in systems that employ carrier aggregation.

SUMMARY

Even with the several uplink control channel techniques and formats already standardized by 3GPP, problems remain. For instance, an LTE mobile terminal operating in TDD mode and configured with ACK/NACK multiplexing cannot simultaneously report multiple ACK/NACK bits and a periodic CSI report. If such a collision happens, the conventional approach is to simply drop the CSI report, and transmit only the ACK/NACK bits. This behavior is independent of whether the multiple ACK/NACK bits stem from multiple subframes or multiple aggregated cells.

Periodic CSI reports for multiple cells are handled in Release 10 with time-shifted reporting times, to minimize collisions among CSI reports. To maintain roughly the same CSI periodicity per cell, it is obvious that periodic CSI reports are transmitted more frequently than in Release 8 systems. In each subframe without PUSCH transmission where periodic CSI and multi-cell ACK/NACK collide, the periodic CSI are dropped. Since CSI reports are required for link adaptation, reduced CSI feedback degrades downlink performance. This is in particular a problem for TDD, where only a minority of the available subframes may be uplink subframes.

Thus, without changes to current 3GPP specifications, collisions between ACK/NACK transmissions and CSI reports will likely lead to dropped CSI reports. The novel techniques described herein enable simultaneous transmission of multiple ACK/NACK bits and CSI. With the use of these techniques, fewer CSI reports are dropped, which improves link adaptation and increases throughput. More particularly, in several embodiments of the present invention, these problems are addressed by introducing a new uplink control channel capability that enables a mobile terminal to simultaneously report to the radio network multiple packet receipt status bits, (e.g., ACK/NACK bits) and channel-condition bits (e.g., CSI reports). In some embodiments, this uplink control channel capability also supports sending uplink scheduling requests from the UE in addition to transmitting multiple packet receipt status bits and channel-condition bits. In several embodiments, if the mobile terminal does not have any channel-condition bits to report in a given subframe, it may transmit ACK/NACK bits using an uplink control channel transmission mode that does not allow such simultaneous transmission.

In an example embodiment implemented in a mobile terminal, the mobile terminal first determines that channel-state information and hybrid-ARQ ACK/NACK bits corresponding to a plurality of downlink subframes or a plurality of downlink carriers, or both, are scheduled for transmission in an uplink subframe. The mobile terminal then determines whether the number of the hybrid-ARQ ACK/NACK bits is less than or equal to a threshold number. If so, the mobile terminal transmits both the channel-state information and the hybrid-ARQ ACK/NACK bits in physical control channel resources of the uplink subframe, on a single carrier. In some embodiments, the number of the hybrid-ARQ ACK/NACK bits considered in the previously summarized technique represents a number of ACK/NACK bits after ACK/NACK bundling. In some embodiments, the threshold number depends on the number of channel-state information bits scheduled for transmission in the uplink subframe.

In a variant of these techniques, the mobile terminal determines, for a different uplink subframe, that second channel-state information and second hybrid-ARQ ACK/NACK bits corresponding to a plurality of downlink subframes or a plurality of downlink carriers, or both, are scheduled for transmission. The mobile terminal again determines whether the number of the second hybrid-ARQ ACK/NACK bits is less than or equal to the threshold number. In this case, the answer is no, so the mobile terminal drops the second channel-state information and transmits the second hybrid-ARQ ACK/NACK bits in physical control channel resources of the second uplink subframe, on a single carrier, in response to determining that the number of hybrid-ARQ ACK/NACK bits to be transmitted in the second uplink subframe is not less than or equal to the threshold number.

In another variant, the mobile terminal determines, for a different uplink subframe, that second channel-state information and a second hybrid-ARQ ACK/NACK bits corresponding to a plurality of downlink subframes or a plurality of downlink carriers, or both, are scheduled for transmission in a second uplink subframe. The mobile terminal again determines whether the number of the second hybrid-ARQ ACK/NACK bits is less than or equal to the threshold number. If not, the mobile terminal bundles the second hybrid-ARQ ACK/NACK bits to produce a number of bundled ACK/NACK bits that is less than or equal to the threshold number, in response to determining that the number of hybrid-ARQ ACK/NACK bits to be transmitted in the second uplink subframe is not less than or equal to the threshold number, and transmits both the second channel-state information and the bundled ACK/NACK bits in physical control channel resources of the second uplink subframe, on a single carrier.

As discussed more fully below, the present techniques may be implemented in a Long-Term Evolution (LTE) wireless system, in which case the hybrid-ARQ ACK/NACK bits and the channel-state information are transmitted using a Physical Uplink Control Channel (PUCCH) Format 3 resource. In some embodiments, the mobile terminal encodes the hybrid-ARQ ACK/NACK bits using a first encoder and separately encodes the channel-state information bits using a second encoder, and interleaves the encoded hybrid-ARQ ACK/NACK bits and the encoded channel-state information bits before transmission.

Complementary techniques for receiving and processing information transmitted according to the techniques described above are also disclosed in detail below. In addition, mobile terminal apparatus and base station apparatus adapted to carry out any of these techniques are disclosed. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
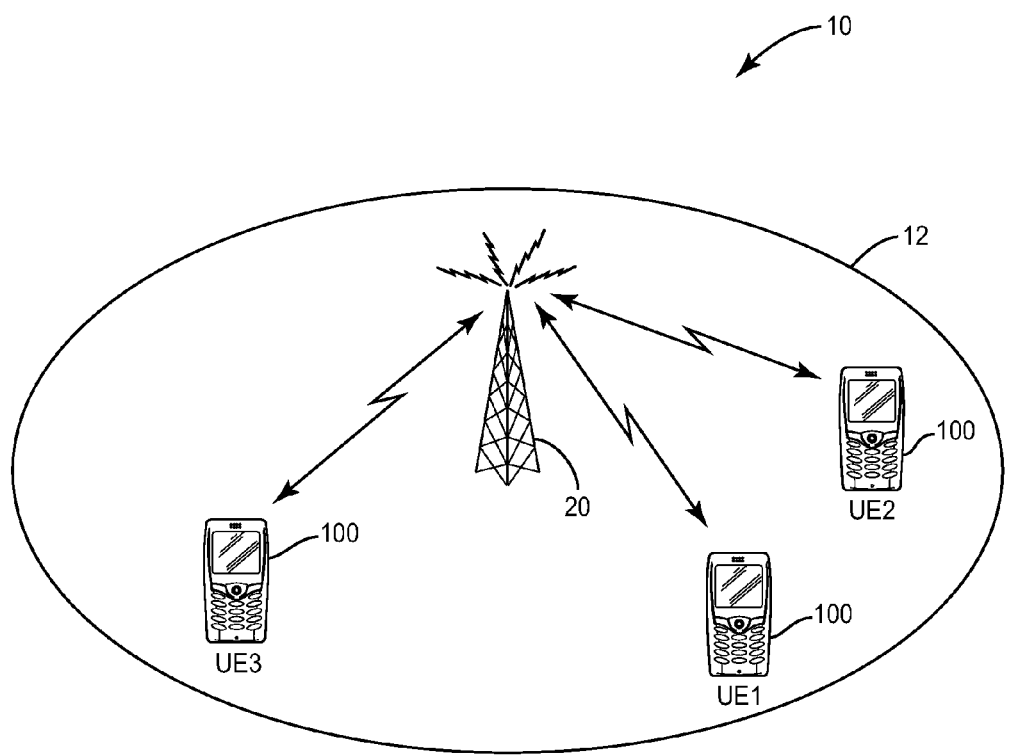
FIG. 1 illustrates an example of a mobile communication system.

Referring now to the drawings, FIG. 1 illustrates an exemplary mobile communication network 10 for providing wireless communication services to mobile terminals 100. Three mobile terminals 100, which are referred to as "user equipment" or "UE" in LTE terminology, are shown in FIG. 1. The mobile terminals 100 may comprise, for example, cellular telephones, personal digital assistants, smart phones, laptop computers, handheld computers, or other devices with wireless communication capabilities. The mobile communication network 10 comprises a plurality of geographic cell areas or sectors 12. Each geographic cell area or sector 12 is served by a base station 20, which is referred to in LTE as a NodeB or Evolved NodeB (eNodeB). One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

For illustrative purposes, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid.

Figure 2:
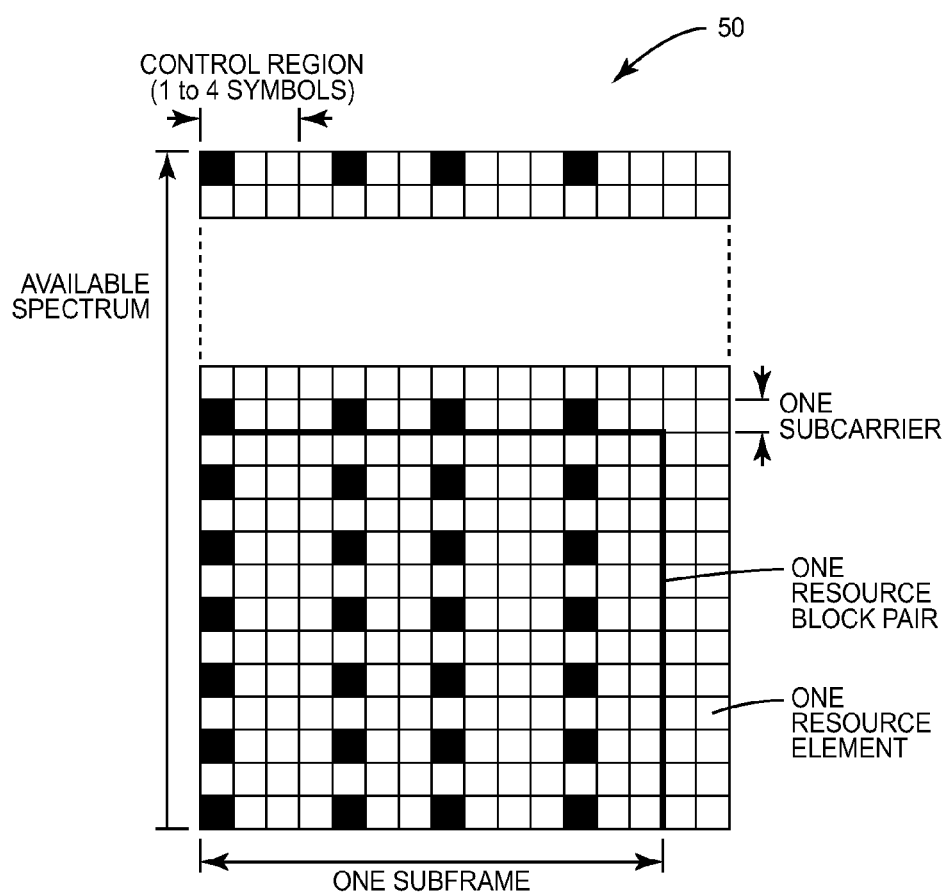
FIG. 2 illustrates a grid of time-frequency resources for a mobile communication system that uses OFDM.

FIG. 2 illustrates a portion of the available spectrum of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element consists of one OFDM subcarrier during one OFDM symbol interval.

Resource elements are grouped into resource blocks, where each resource block in turn consists of twelve OFDM subcarriers, within one of two equal-length slots of a subframe. FIG. 2 illustrates a resource block pair, comprising a total of 168 resource elements.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink system with a control region of three OFDM symbols is illustrated in FIG. 2. The dynamic scheduling information is communicated to the UEs ("user equipment," 3GPP terminology for a mobile station) via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 3:
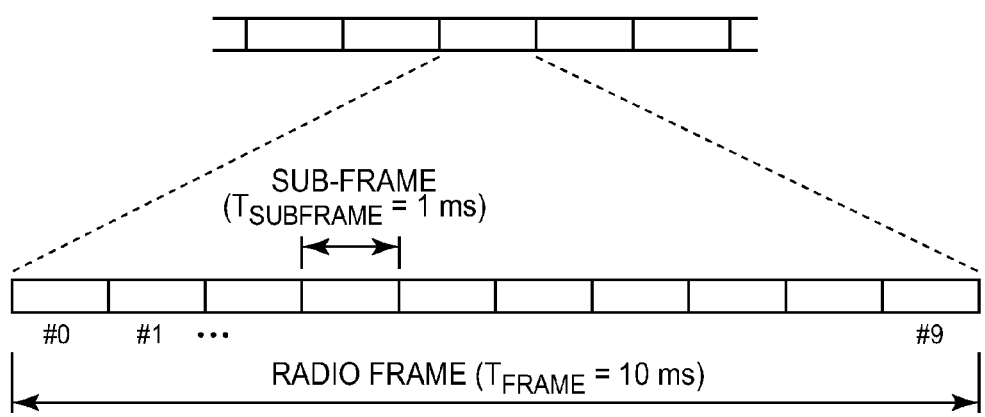
FIG. 3 illustrates the time-domain structure of an LTE signal.

As shown in FIG. 3, LTE downlink transmissions are further organized into radio frames of 10 milliseconds, in the time domain, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

For error control, LTE uses hybrid-ARQ (HARQ), where, after receiving downlink data in a subframe, the mobile terminal attempts to decode it and reports to the base station whether the decoding was successful (ACK) or not (NACK) via a Physical Uplink Control Channel (PUCCH). In the event of an unsuccessful decoding attempt, the base station (evolved NodeB, or eNodeB, in 3GPP terminology) can retransmit the erroneous data. Similarly, the base station can indicate to the UE whether the decoding of the PUSCH was successful (ACK) or not (NACK) via the Physical Hybrid ARQ Indicator CHannel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

When a UE has data to transmit on PUSCH, it multiplexes the uplink control information with data on PUSCH. Thus, a UE only uses PUCCH for signaling this uplink control information when it does not have any data to transmit on PUSCH. Accordingly, if the mobile terminal has not been assigned an uplink resource for data transmission, Layer 1/Layer 2 (L1/L2) control information, including channel-status reports, hybrid-ARQ acknowledgments, and scheduling requests, is transmitted in uplink resources (resource blocks) specifically assigned for uplink L1/L2 control on the Physical Uplink Control CHannel (PUCCH), which was first defined in Release 8 of the 3GPP specifications (LTE Rel-8).

Figure 4:
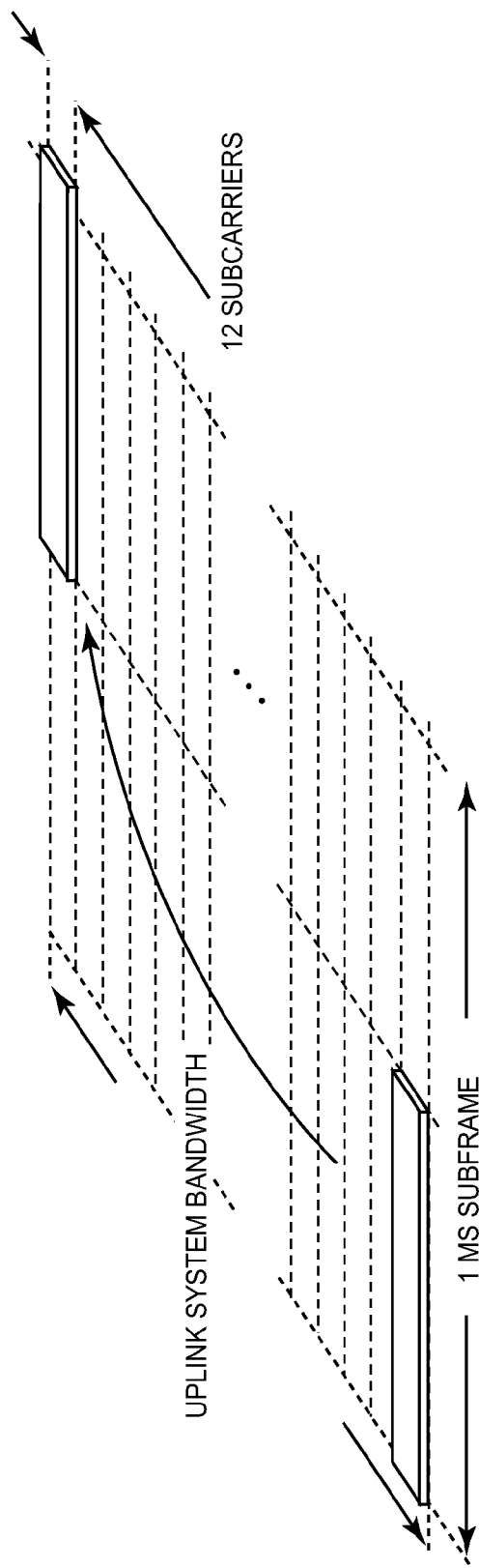
FIG. 4 illustrates the positioning of PUCCH resources in an uplink subframe according to Release 8 standards for LTE.

As illustrated in FIG. 4, these resources are located at the edges of the uplink cell bandwidth that is available to the mobile terminal for use. Each physical control channel resource is made up of a pair of resource blocks, where each resource block in turn consists of twelve OFDM subcarriers, within one of the two slots of the uplink subframe. In order to provide frequency diversity, the physical control channel resources are frequency hopped on the slot boundary—thus, the first resource block of the pair is at the lower part of the spectrum within the first slot of the subframe while the second resource block of the pair is positioned at the upper part of the spectrum during the second slot of the subframe (or vice-versa). If more resources are needed for the uplink L1/L2 control signaling, such as in case of very large overall transmission bandwidth supporting a large number of users, additional resource blocks can be assigned, adjacent to the previously assigned resource blocks.

The reasons for locating the PUCCH resources at the edges of the overall available spectrum are two-fold. First, together with the frequency hopping described above, this maximizes the frequency diversity experienced by the control signaling, which can be encoded so that it is spread across both resource blocks. Second, assigning uplink resources for the PUCCH at other positions within the spectrum, i.e., not at the edges, would fragment the uplink spectrum, making it difficult to assign very wide transmission bandwidths to a single mobile terminal while still retaining the single-carrier property of the uplink transmission.

When a UE has ACK/NACK to send in response to a downlink PDSCH transmission, it determines which PUCCH resource to use from the PDCCH transmission that assigned the PDSCH resources to the UE. More specifically, an index to the PUCCH resource for the UE is derived from the number of the first control channel element used to transmit the downlink resource assignment. When a UE has a scheduling request or CQI to send, it uses a specific PUCCH resource that has been pre-configured for the UE by higher layer signaling.

Depending on the different types of information that PUCCH is to carry, several different PUCCH formats may be used. The data-carrying capacity of a pair of resource blocks during one subframe is more than is generally needed for the short-term control signaling needs of one mobile terminal. Therefore, to efficiently exploit the resources set aside for control signaling, multiple mobile terminals can share the same physical control channel resource. This is done by assigning each of several mobile terminals different orthogonal phase-rotations of a cell-specific, length-12, frequency-domain sequence and/or different orthogonal time-domain cover codes. By applying these frequency-domain rotations and/or time-domain covering codes to the encoded control channel data, as many as 36 mobile terminals can share a given physical control channel resource in some circumstances.

Several different encoding formats have been developed by 3GPP to encode different quantities and types of uplink control channel data, within the constraints of a single physical control channel resource. These several formats, known generally as PUCCH Format 1, PUCCH Format 2, and PUCCH Format 3, are described in detail at pages 226-242 of the text "4G LTE/LTE-Advanced for Mobile Broadband," by Erik Dahlman, Stefan Parkvall, and Johan Sköld (Academic Press, Oxford UK, 2011), and are summarized briefly below.

PUCCH formats 1, 1a, and 1b, which are used to transmit scheduling requests and/or ACK/NACK, are based on cyclic shifts of a Zadoff-Chu sequence. A modulated data symbol is multiplied with the cyclically Zadoff-Chu shifted sequence. The cyclic shift varies from one symbol to another and from one slot to the next. Although twelve different shifts are available, higher-layer signaling may configure UEs in a given cell to use fewer than all of the shifts, to maintain orthogonality between PUCCH transmissions in cells that exhibit high frequency selectivity. After the modulated data symbol is multiplied with the Zadoff-Chu sequence, the result is spread using an orthogonal spreading sequence. PUCCH formats 1, 1a, and 1b carry three reference symbols per slot (when normal cyclic prefix is used), at SC-FDMA symbol numbers 2, 3, and 4.

PUCCH Formats 1a and 1b refer to PUCCH transmissions that carry either one or two hybrid-ARQ acknowledgements, respectively. A PUCCH Format 1 transmission (carrying only a SR) is transmitted on a UE-specific physical control channel resource (defined by a particular time-frequency resource, a cyclic-shift, and an orthogonal spreading code) that has been pre-configured by RRC signaling. Likewise, PUCCH Format 1a or 1b transmissions carrying only hybrid-ARQ acknowledgements are transmitted on a different UE-specific physical control channel resource. PUCCH Format 1a or 1b transmissions that are intended to carry both ACK/NACK information and a scheduling request are transmitted on the assigned SR resource for positive SR transmission, and are encoded with the ACK/NACK information.

Figure 5:
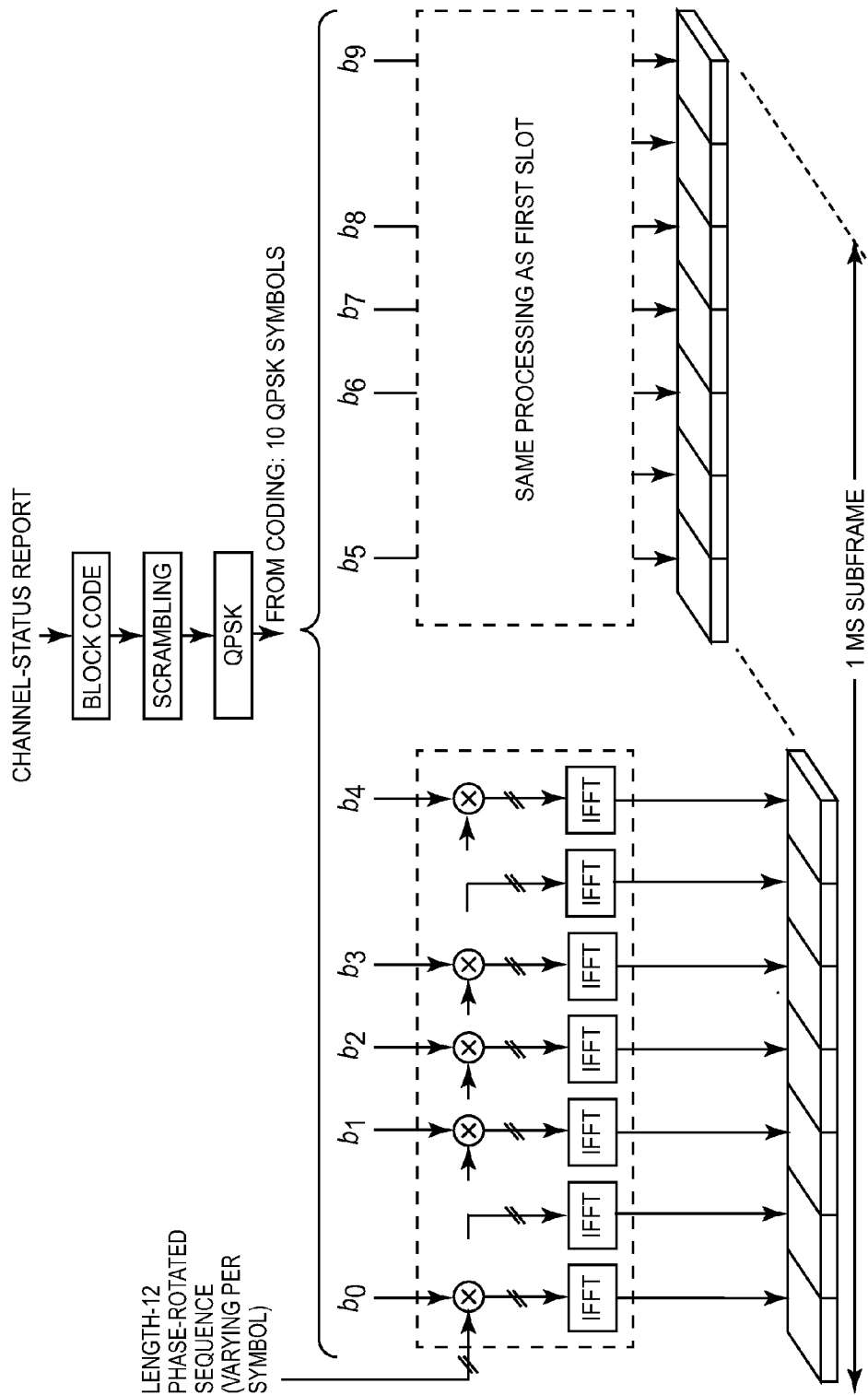
FIG. 5 illustrates the encoding and modulation of channel-status information according to PUCCH Format 2.

PUCCH Format 1/1a/1b transmissions carry only one or two bits of information (plus scheduling requests, depending on the physical control channel resource used for the transmission). Because channel-state information reports require more than two bits of data per subframe, PUCCH Format 2/2a/2b is used for these transmissions. As illustrated in FIG. 5, in PUCCH formats 2, 2a, and 2b, the channel-status reports are first block-coded, and then the block-coded bits for transmission are scrambled and QPSK modulated. (FIG. 5 illustrates coding for a subframe using a normal cyclic prefix, with seven symbols per slot. Slots using extended cyclic prefix have only one reference-signal symbol per slot, instead of two.) The resulting ten QPSK symbols are then multiplied with a cyclically shifted Zadoff-Chu type sequence, a length-12 phase-rotated sequence, where again the cyclic shift varies between symbols and slots. Five of the symbols are processed and transmitted in the first slot, i.e., the slot appearing on the left-hand side of FIG. 5, while the remaining five symbols are transmitted in the second slot. PUCCH formats 2, 2a, and 2b carry two reference symbols per slot, located on SC-FDMA symbol numbers 1 and 5.

For UEs operating in accordance with LTE Release 8 or LTE Release 9 (i.e., without carrier aggregation), it is possible to configure the UE in a mode where it reports ACK/NACK bits and CSI bits simultaneously. If the UE is using normal cyclic prefix, one or two ACK/NACK bits are modulated onto a QPSK symbol on the second reference signal (RS) resource element in each slot of the PUCCH format 2. If one ACK/NACK bit is modulated on the second RS in each slot, the PUCCH format used by the UE is referred to as PUCCH Format 2a. If two ACK/NACK bits are modulated on the second RS in each slot the PUCCH format used by the UE is referred to as PUCCH Format 2b. If the UE is configured with extended cyclic prefix, one or two ACK/NACK bits are jointly coded with channel-state information (CSI) feedback and transmitted together within PUCCH format 2.

As with PUCCH Format 1 transmissions, a pair of resource blocks allocated to PUCCH can carry multiple PUCCH Format 2 transmissions from several UEs, with the separate transmissions separated by the cyclic shifting. As with PUCCH Format 1, each unique PUCCH Format 2 resource can be represented by an index from which the phase rotation and other quantities necessary are derived. The PUCCH format 2 resources are semi-statically configured. It should be noted that a pair of resource blocks can either be configured to support a mix of PUCCH formats 2/2a/2b and 1/1a/1b, or to support formats 2/2a/2b exclusively.

3GPP's Release 10 of the LTE standards (LTE Release 10) has been published and provides support for bandwidths larger than 20 MHz, through the use of carrier aggregation. One important requirement placed on the development of LTE Release 10 specifications was to assure backwards compatibility with LTE Release 8. The need for spectrum compatibility dictated that an LTE Release 10 carrier that is wider than 20 MHz should appear as a number of distinct, smaller bandwidth, LTE carriers to an LTE Release 8 mobile terminal. Each of these distinct carriers can be referred to as a component carrier.

For early LTE Release 10 system deployments in particular, it can be expected that there will be a relatively small number of LTE Release 10-capable mobile terminals, compared to many "legacy" mobile terminals that conform to earlier releases of the LTE specifications. Therefore, it is necessary to ensure the efficient use of wide carriers for legacy mobile terminals as well as Release 10 mobile terminals, i.e., that it is possible to implement carriers where legacy mobile terminals can be scheduled in all parts of the wideband LTE Release 10 carrier.

Figure 6:
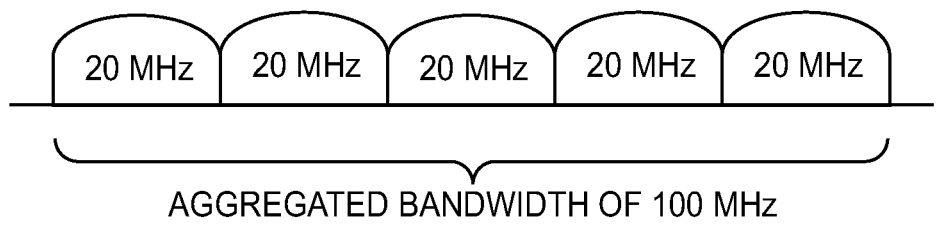
FIG. 6 illustrates several carriers aggregated to form an aggregated bandwidth of 100 MHz.

One straightforward way to obtain this is by means of a technique called carrier aggregation. With carrier aggregation, an LTE Release 10 mobile terminal can receive multiple component carriers, where each component carrier has (or at least may have) the same structure as a Release 8 carrier. The basic concept of carrier aggregation is illustrated in FIG. 6, which illustrates the aggregation of five 20-MHz component carriers to yield an aggregated bandwidth of 100 MHz.

The number of aggregated component carriers as well as the bandwidth for each individual component carrier may be different for uplink and downlink. In a symmetric configuration, the number of component carriers in downlink and uplink is the same, whereas the numbers of uplink and downlink carriers differ in an asymmetric configuration.

During initial access, an LTE Release 10 mobile terminal behaves similarly to an LTE Release 8 mobile terminal, requesting and obtaining access to a single carrier for the uplink and downlink. Upon successful connection to the network a mobile terminal may—depending on its own capabilities and the network—be configured with additional component carriers in the uplink (UL) and downlink (DL).

Even if a mobile terminal is configured with additional component carriers, it need not necessarily monitor all of them, all of the time. This is because LTE Release 10 supports activation of component carriers, as distinct from configuration. The mobile terminal monitors for PDCCH and PDSCH only component carriers that are both configured and activated. Since activation is based on Medium Access Control (MAC) control elements—which are faster than RRC signaling—the activation/de-activation process can dynamically follow the number of component carriers that is required to fulfill the current data rate needs. All but one component carrier—the downlink Primary component carrier (DL PCC)—can be deactivated at any given time.

Scheduling of a component carrier is done using the PDCCH or ePDCCH (extended PDCCH), via downlink assignments. Control information on the PDCCH or ePDCCH is formatted as a Downlink Control Information (DCI) message. In Release 8, where a mobile terminal only operates with one downlink and one uplink component carrier, the association between downlink assignment, uplink grants, and the corresponding downlink and uplink component carriers is very clear. In Release 10, however, two modes of carrier aggregation need to be distinguished. The first mode is very similar to the operation of multiple Release 8 mobile terminals, in that a downlink assignment or uplink grant contained in a DCI message transmitted on a component carrier applies either to the downlink component carrier itself or to a uniquely associated uplink component carrier. (This association may be either via cell-specific or UE-specific linking.) A second mode of operation augments a DCI message with a Carrier Indicator Field (CIF). A DCI containing a downlink assignment with CIF applies to the specific downlink component carrier indicated by the CIF, while a DCI containing an uplink grant with CIF applies to the indicated uplink component carrier.

DCI messages for downlink assignments contain, among other things, resource block assignment, modulation and coding scheme related parameters, and HARQ redundancy version indicators. In addition to those parameters that relate to the actual downlink transmission, most DCI formats for downlink assignments also contain a bit field for Transmit Power Control (TPC) commands. These TPC commands are used to control the uplink power control behavior of the corresponding PUCCH that is used to transmit the HARQ feedback.

Transmission of PUCCH in a carrier aggregation scenario (called "CA PUCCH" hereinafter) creates several issues. In particular, multiple hybrid-ARQ acknowledgement bits need to be fed back in the event of simultaneous transmission on multiple component carriers. Furthermore, from the perspective of the UE, both symmetric and asymmetric uplink/downlink component carrier configurations are supported. For some configurations, one may consider the possibility to transmit uplink control information on multiple PUCCH, or on multiple uplink component carriers. However, this option is likely to result in higher UE power consumption and a dependency on specific UE capabilities. It may also create implementation issues due to inter-modulation products, and would lead to generally higher complexity for implementation and testing.

Therefore, the transmission of PUCCH should have limited dependency on the uplink/downlink component carrier configuration. Thus, all uplink control information for a UE is transmitted on a single uplink component carrier, according to the 3GPP Release 10 specifications. A semi-statically configured and UE-specific uplink primary component carrier, which is frequently referred to as the "anchor carrier," is exclusively used for PUCCH.

UEs operating in accordance with LTE Release 8 or LTE Release 9 (i.e., without carrier aggregation) are configured with only a single downlink component carrier and uplink component carrier. The time-frequency resource location of the first Control Channel Element (CCE) used to transmit PDCCH for a particular downlink assignment determines the dynamic ACK/NACK resource for Release 8 PUCCH. No PUCCH collisions can occur, since all PDCCH for a given subframe are transmitted using a different first CCE.

In a cell-asymmetric carrier aggregation scenario (or perhaps also for other reasons), multiple downlink component carriers may be cell-specifically linked to the same uplink component carrier. Mobile terminals configured with the same uplink component carrier but with different downlink component carriers (with any of the downlink component carrier that are cell-specifically linked with the uplink component carrier) share the same uplink PCC but may have different aggregations of secondary component carriers, in either the uplink or downlink. In this case, mobile terminals receiving their downlink assignments from different downlink component carriers will transmit their HARQ feedback on the same uplink component carrier. It is up to the scheduling process at the base station (in LTE, the evolved Node B, or eNB) to ensure that no PUCCH collisions occur.

When a mobile terminal is configured with multiple downlink component carriers it makes sense to use the Release 8 approach when possible. Each PDCCH transmitted on the downlink primary component carrier has, according to Release 8 specifications, a PUCCH resource reserved on the uplink primary component carrier. Thus, when a mobile terminal is configured with multiple downlink component carriers but receives a downlink assignment for only the downlink primary component carrier, it should still use the PUCCH resource on the uplink primary component carrier as specified in Release 8.

An alternative would be to specify the use of a "carrier aggregation PUCCH," or "CA PUCCH," which enables feedback of HARQ bits corresponding to the number of configured component carriers, for use whenever the mobile terminal is configured with multiple downlink carriers, regardless of whether a particular assignment is only for the downlink primary component carrier. Since configuration is a rather slow process and a mobile terminal may be configured with multiple component carriers often—even though only the downlink primary component carrier is active and used—this would lead to a very inefficient usage of carrier aggregation PUCCH resources.

Upon reception of downlink assignments on a single secondary component carrier or upon reception of multiple downlink assignments, a special carrier aggregation PUCCH should be used. While in the latter case it is obvious to use CA PUCCH—since only CA PUCCH supports feedback of HARQ bits of multiple component carriers—it is less clear that CA PUCCH should also be used in the first case. First, a downlink secondary component carrier assignment alone is not typical. The eNodeB scheduler should strive to schedule a single downlink component carrier assignment on the downlink primary component carrier and try to de-activate secondary component carriers if only a single downlink carrier is needed. Another issue is that the PDCCH for a downlink secondary component carrier assignment is transmitted on the secondary component carrier (assuming CIF is not configured) and, hence there is no automatically reserved Rel-8 PUCCH resource on the uplink primary component carrier. Using the Rel-8 PUCCH even for stand-alone downlink secondary component carrier assignments would require reserving Rel-8 resources on the uplink primary component carrier for any downlink component carrier that is configured for any mobile terminal that uses this uplink primary component carrier. Since stand-alone secondary component carrier assignments are atypical, this would lead to an unnecessary over-provisioning of Rel-8 PUCCH resources on uplink primary component carrier.

It should be noted that a possible error case that may occur with CA PUCCH arises when the eNodeB schedules a mobile terminal on multiple downlink component carriers, including the primary component carrier. If the mobile terminal misses all but the downlink primary component carrier assignment, it will use Rel-8 PUCCH instead of CA PUCCH. To detect this error case the eNodeB has to monitor both the Rel-8 PUCCH and the CA PUCCH in the event that assignments for multiple downlink component carriers have been sent.

The number of HARQ feedback bits that a mobile terminal has to provide depends on the number of downlink assignments actually received by the mobile terminal. In a first case, the mobile terminal could adopt a particular CA PUCCH format according to the number of received assignments and provide feedback accordingly. However, one or more PDCCHs carrying downlink assignments can get lost. Adopting a CA PUCCH format according to the number of received downlink assignments is therefore ambiguous, and would require the testing of many different hypotheses at the eNodeB.

Alternatively, the PUCCH format could be set by the carrier activation message. A working group in 3GPP has decided that activation and de-activation of component carriers is done with Medium Access Control (MAC) layer control element and that per-component-carrier activation and de-activation is supported. MAC signaling, and especially the HARQ feedback signaling indicating whether the activation command has been received successfully, is error prone. Furthermore, this approach requires testing of multiple hypotheses at the eNodeB.

Accordingly, basing the CA PUCCH format on the number of configured component carrier seems therefore the safest choice. Configuration of component carrier is based on Radio Resource Control (RRC) signaling. After successful reception and application of a new configuration, a confirmation message is sent back, making RRC signaling very safe.

As noted earlier, feedback of ARQ ACK/NACK information for two or more component carriers may require the transmission of more than two bits, which is the most that can be handled by PUCCH Format 1. Accordingly, PUCCH for carrier aggregation scenarios requires additional techniques or formats. Two approaches were specified in LTE Release 10 specifications. First, PUCCH Format 1 may be used in combination with a technique called resource selection or channel selection. However, this is not an efficient solution for more than four bits. Accordingly, another format, PUCCH Format 3, has been developed to enable the possibility of transmitting more than four ACK/NACK bits in an efficient way.

The first of these two approaches is often simply called channel selection. The basic principle behind this approach is that the UE is assigned a set of up to four different PUCCH format 1a/1b resources. The UE then selects one of the resources according to the ACK/NACK sequence the UE should transmit. Thus, the selection of a particular one of the resources serves to communicate up to two bits of information. On one of the assigned resources the UE then transmits a QPSK or BPSK symbol value, encoding the remaining one or two bits of information. The eNodeB detects which resource the UE uses as well as the QPSK or BPSK value transmitted on the used resource and combines this information to decode a HARQ response for downlink cells associated with the transmitting UE.

Figure 7:
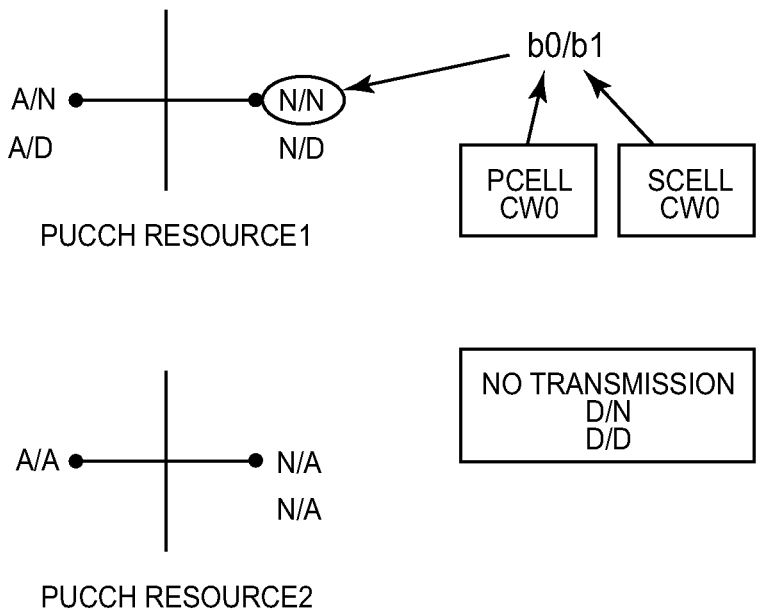
FIGS. 7, 8, and 9 illustrate the coding of multiple ACK/NACK bits using channel selection.
Figure 8:
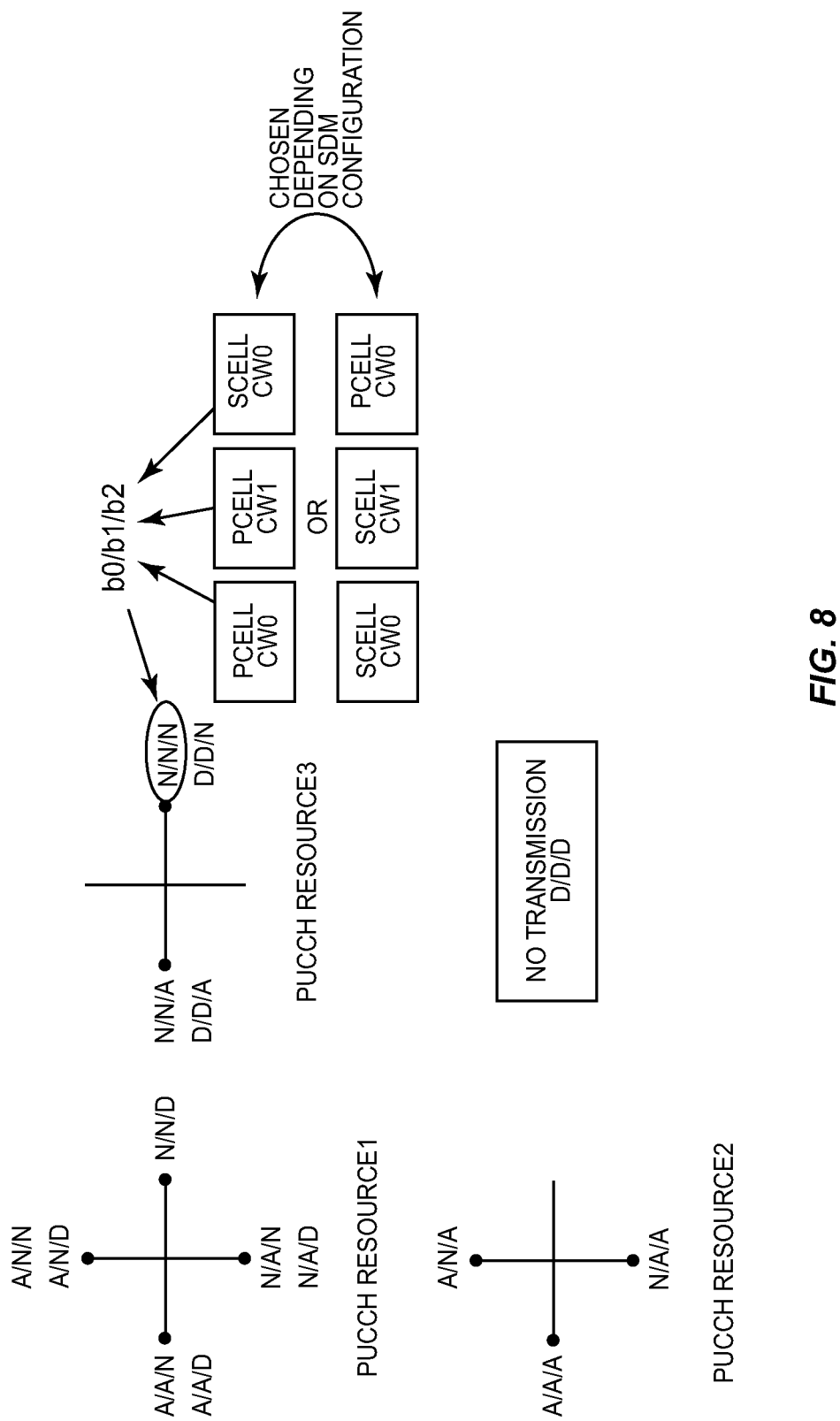
Figure 9:
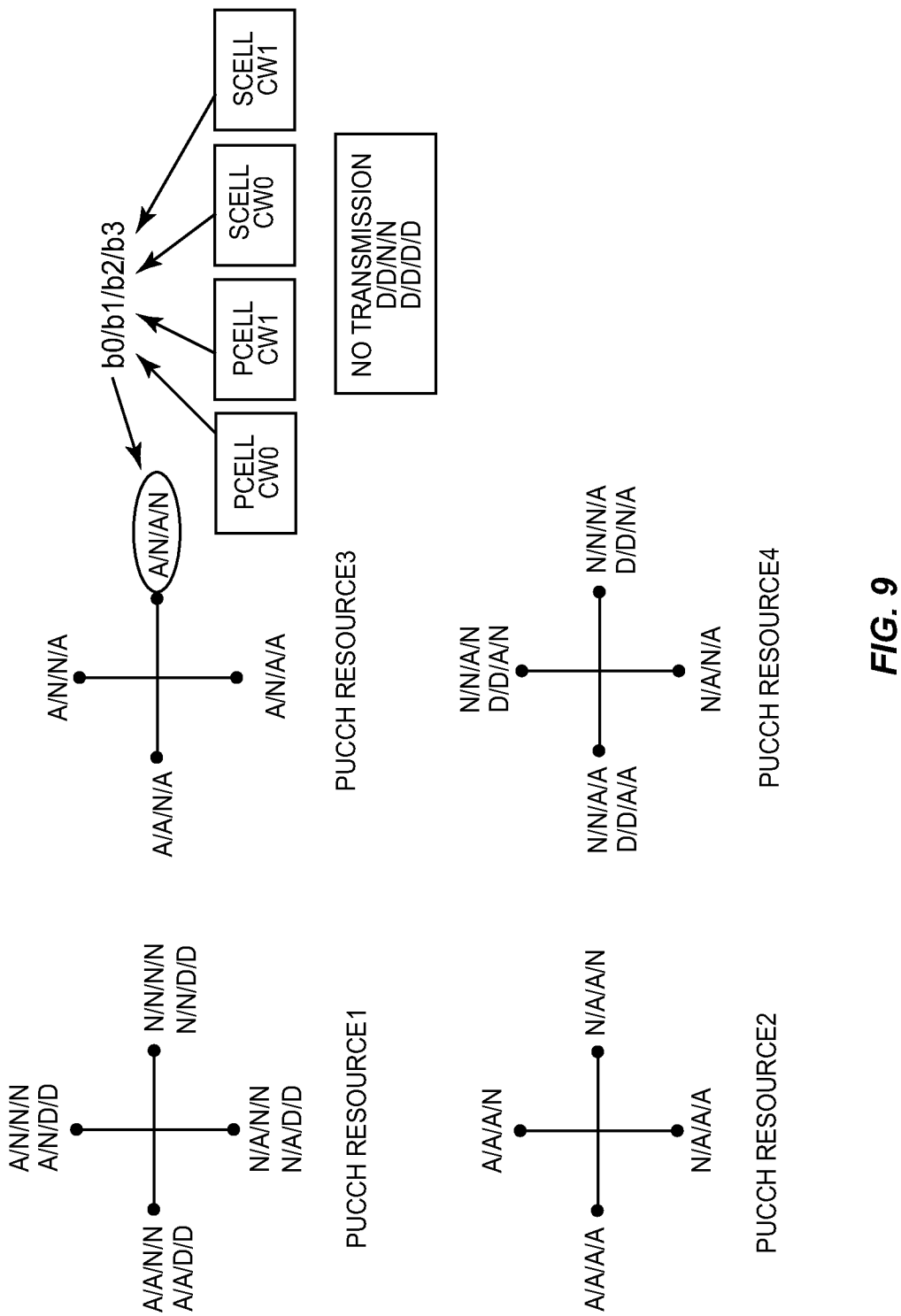

The use of channel selection to code ACK (A), NACK (N) and DTX (D) for multiple component carriers is shown in FIG. 7, FIG. 8, and FIG. 9, which apply to LTE FDD systems. A similar type of mapping, but including a bundling approach, is done for TDD in the event that the UE is configured with channel selection.

In FIG. 7, two ACK/NACK messages are transmitted and two PUCCH resources are configured. In each resource, a BPSK modulated symbol can be transmitted, as shown in the figure, hence in total one out of four different signals can be transmitted. If PUCCH resource 1 is selected, then one of the BPSK constellation points indicates an ACK for primary cell codeword 0 (indicated as PCell CW0 in the figures) and a NACK for secondary cell codeword 0 (Scell CW0), or ACK and DTX respectively. This is shown as A/N and A/D in FIG. 7. The other constellation point in this PUCCH resource 1 indicates NACK and NACK (or NACK and DTX) for the primary cell and secondary cell respectively. Thus, a BPSK symbol transmitted in PUCCH resource 1 indicates either ACK/NACK or ACK/DTX for the primary cell and secondary cell, respectively, for a first value of the BPSK symbol, and NACK/NACK or NACK/DTX for the primary cell and secondary cell, respectively, for the other value of the BPSK symbol. If PUCCH resource 2 is selected for transmission, on the other hand, then the first value of the BPSK symbol indicate A/A (ACK/ACK) for the primary and secondary cells, respectively, while the second value indicates N/A (NACK/ACK) or D/A (DTX/ACK) for the primary and secondary cells.

For example, if the mobile terminal wants to report an ACK for the primary and a NACK for the secondary cell, then PUCCH resource 1 is selected and the BPSK constellation point corresponding to A/N is transmitted. Note that since this constellation point also indicates A/D, there is no difference from the eNB perspective whether the mobile terminal reports a NACK or DTX for the transmission on the secondary cell. In FIGS. 8 and 9, this principle is extended to 3 and 4 ACK/NACK bits, respectively. Thus, three PUCCH resources are configured to send 3 ACK/NACK bits, as shown in FIG. 8, while four PUCCH resources are configured to send 4 ACK/NACK bits, as shown in FIG. 9. QPSK modulation is used in both cases; thus a symbol transmitted in a given one of the 3 or four PUCCH resources can indicate one of up to four different combinations of ACK/NACK bits.

Figure 10:
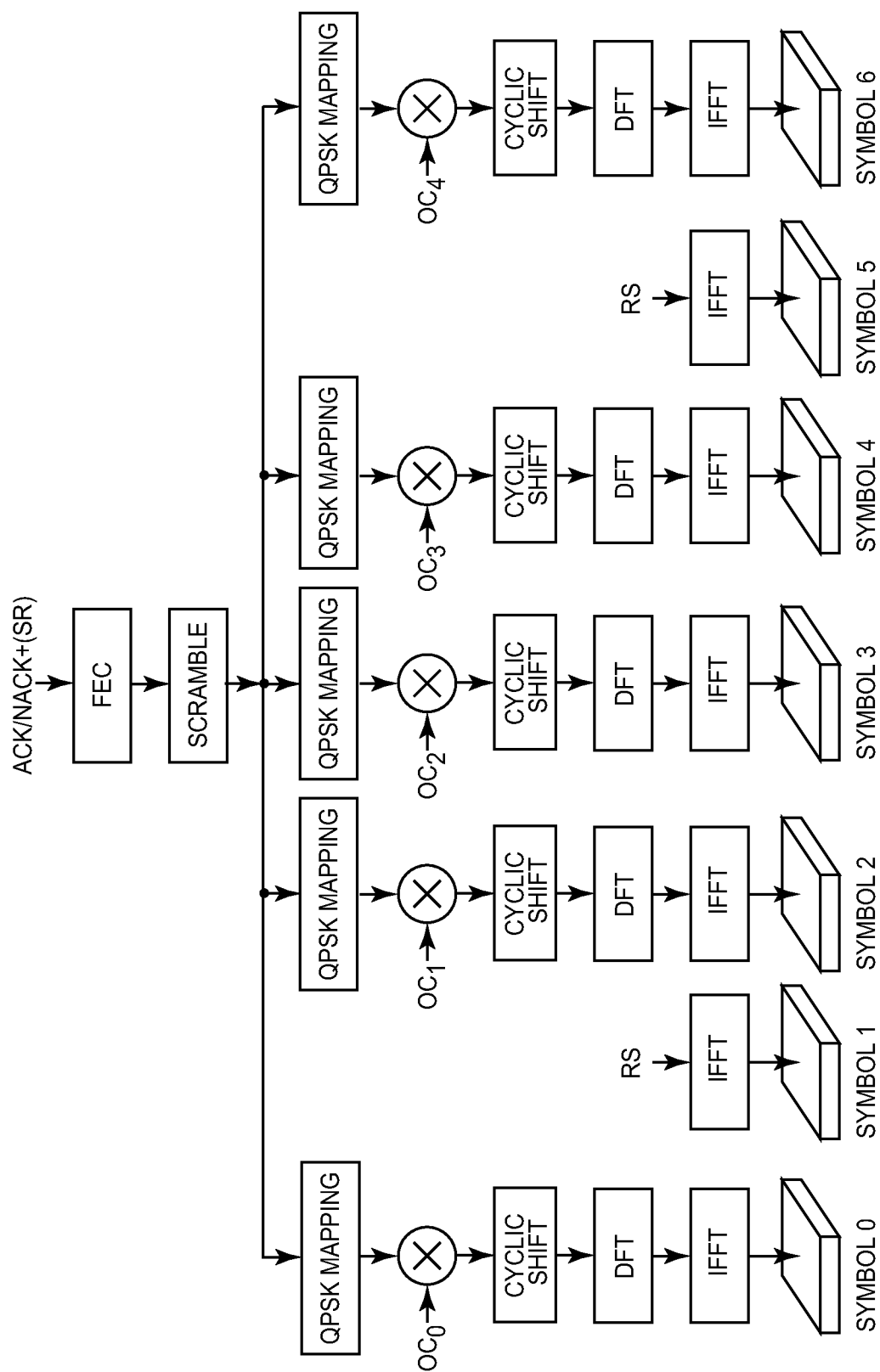
FIG. 10 illustrates the encoding and modulation of multiple ACK/NACK bits according to PUCCH Format 3.

A second approach, which is more efficient when more than four bits of information need to be transmitted, is called PUCCH Format 3 and is based on Discrete Fourier Transform (DFT)-spread OFDM. FIG. 10 shows a block diagram of that design, for a single slot. The same processing is applied to the second slot of the uplink frame. The multiple ACK/NACK bits are encoded, using a forward-error correction (FEC) code, to form 48 coded bits. The coded bits are then scrambled, using cell-specific (and possibly DFT-spread OFDM symbol dependent) sequences. 24 bits are transmitted within the first slot and the other 24 bits are transmitted within the second slot. The 24 bits per slot are then mapped into 12 QPSK symbols, as indicated by the blocks labeled "QPSK mapping" in FIG. 10, which appear in five of the OFDM symbols of the slot (symbols 0, 2, 3, 4, and 6). The sequence of symbols in each of these five symbols in the slot is spread with OFDM-symbol-specific orthogonal cover codes, indicated by OC0, OC1, OC2, OC3, and OC4 in FIG. 10, and cyclically shifted, prior to DFT-precoding. The DFT-precoded symbols are converted to OFDM symbols (using an Inverse Fast-Fourier Transform, or IFFT) and transmitted within one resource block (the bandwidth resource) and five DFT-spread OFDM symbols (the time resource). The spreading sequence or orthogonal cover code (OC) is UE-specific and enables multiplexing of up to five users within the same resource blocks.

For the reference signals (RS), cyclic-shifted constant-amplitude zero-autocorrelation (CAZAC) sequences can be used. For example, the computer optimized sequences in 3GPP TS 36.211, "Physical Channels and Modulation," can be used.

Even with the several PUCCH formats already standardized by 3GPP, problems remain. For instance, an LTE mobile terminal operating in TDD mode and configured with ACK/NACK multiplexing cannot simultaneously report multiple ACK/NACK bits and a periodic CSI report. If such a collision happens, the conventional approach is to simply drop the CSI report, and transmit only the ACK/NACK bits. This behavior is independent of whether the multiple ACK/NACK bits stem from multiple subframes or multiple aggregated cells.

Periodic CSI reports for multiple cells are handled in Release 10 with time-shifted reporting times, to minimize collisions among CSI reports. To maintain roughly the same CSI periodicity per cell, it is obvious that periodic CSI reports are transmitted more frequently than in Release 8 systems. In each subframe without PUCCH transmission where periodic CSI and multi-cell ACK/NACK collide, the periodic CSI are dropped. Since CSI reports are required for link adaptation, reduced CSI feedback degrades downlink performance. This is in particular a problem for TDD, where only a minority of the available subframes may be uplink subframes.

In several embodiments of the present invention, these problems are addressed by introducing a new uplink control channel capability that enables a mobile terminal to simultaneously report to the radio network multiple packet receipt status bits, (e.g., ACK/NACK bits) and channel-condition bits (e.g., CSI reports). In some embodiments, this uplink control channel capability also supports sending uplink scheduling requests from the UE in addition to transmitting multiple packet receipt status bits and channel-condition bits. In several embodiments, if the mobile terminal does not have any channel-condition bits to report in a given subframe, it may transmit ACK/NACK bits using an uplink control channel transmission mode that does not allow such simultaneous transmission.

In one non-limiting example embodiment, a situation may arise where the total number of transmitted packet-receipt status bits and channel-condition bits that can be reported with satisfactory performance is limited. The combined reporting in this embodiment is only enabled up to a certain number of packet-receipt status bits. For example, if the number of packet-receipt status bits to be transmitted is less than or equal to a predetermined number (i.e., a threshold), then packet-receipt status bits and channel-condition bits are reported simultaneously over the uplink control channel. On the other hand, if the number of packet-receipt status bits to be transmitted exceeds that number, then the channel-condition bits may be dropped, i.e., discarded, and only the transmitted packet receipt status bits are transmitted.

In another non-limiting example embodiment, if the mobile terminal applies partial "bundling" of the packet-receipt status bits, then the number of transmitted packet-receipt status bits corresponds to the number of bits after bundling. If channel-condition bits are scheduled for reporting and the number of available packet-receipt status bits is larger than a predetermined number, then the packet receipt status-bits are bundled to produce that number of bits or fewer, which are then transmitted together with the channel-condition bits.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

In the following descriptions of non-limiting examples of the present invention, a mobile terminal operating according to the LTE specifications for TDD is assumed, but the described techniques and technology may be applied more generally.

A mobile terminal is configured to report multiple ACK/NACK feedback bits using an uplink control channel, e.g., PUCCH, and an encoding format that enables simultaneous transmission of multiple ACK/NACK bits and CSI bits. This simultaneous transmission of multiple ACK/NACK bits and CSI bits may include configuration of new PUCCH resources, but not necessarily. One example of a PUCCH mode that could be used for this transmission is the PUCCH mode described in a co-pending U.S. patent application, filed on the same date as the present application and entitled "Simultaneous transmission of AN and CSI using PUCCH Format 3 resources," the entire contents of which are incorporated herein by reference. A mobile terminal feeds back multiple ACK/NACK bits if it has to report ACK/NACK bits for multiple subframes and/or for multiple cells. Configuration of the mobile terminal may be performed for example using RRC signaling.

Figure 11:
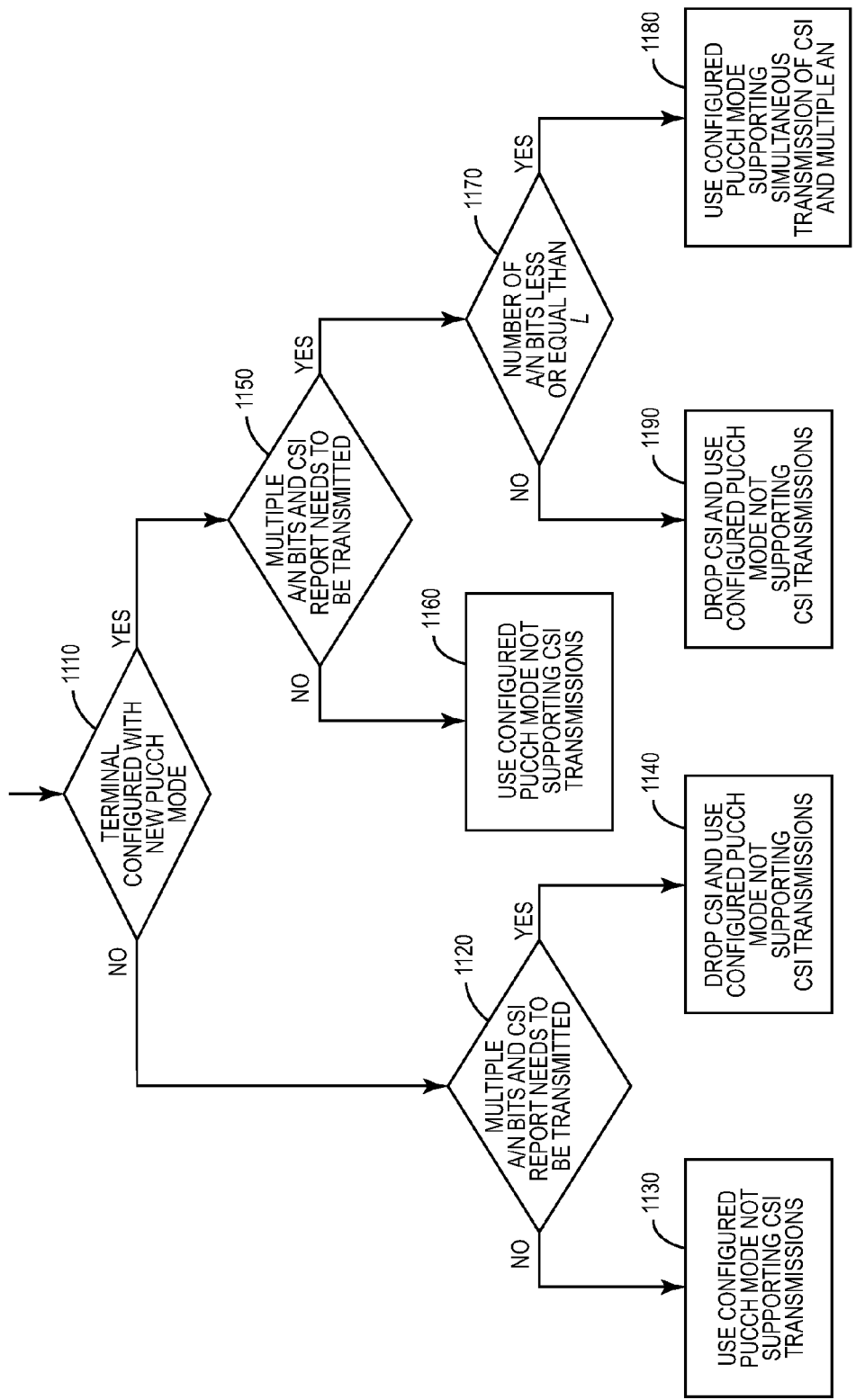
FIGS. 11, 12, 13 are process flow diagrams illustrating example methods for simultaneous reporting of channel-state information and hybrid-ARQ ACK/NACK information.

FIG. 11 is a process flow diagram that shows example procedures for a mobile terminal in accordance with a first, non-limiting example embodiment. As shown at block 1110, the operation of the UE may depend on whether the UE has been configured, e.g., by RRC signaling, to utilize a PUCCH mode that supports simultaneous transmission of ACK/NACK bits and CSI. If not, operation proceeds as illustrated at blocks 1120, 1130, and 1140. The UE first determines whether ACK/NACK bits and a CSI report are both scheduled for transmission in a given subframe, as shown at block 1120. In either case, as shown at blocks 1130 and 1140, the ACK/NACK bits are transmitted, using a PUCCH mode that does not support simultaneous transmission of ACK/NACK bits. If a CSI report is scheduled, however, this involves dropping, i.e., discarding, the CSI report and transmitting only the ACK/NACK bits as shown at block 1140.

On the other hand, if the UE is configured to support a PUCCH mode that supports simultaneous transmission of CSI reports and ACK/NACK bits, the mobile terminal also determines whether ACK/NACK bits and a CSI report are both scheduled for transmission in a given subframe, as shown at block 1150, and may still use a configured PUCCH mode that does not allow simultaneous CSI transmission, as shown at blocks 1160, if the mobile terminal has no CSI bits to report. But if a mobile terminal has ACK/NACK bits and CSI bits to report in the uplink, then the mobile terminal may use a configured PUCCH mode that enables simultaneous transmission of multiple ACK/NACK bits and CSI bits. This PUCCH mode may even support a scheduling request transmission in addition to transmitting multiple ACK/NACK bits and CSI bits.

The process flow illustrated in FIG. 11 reflects the fact that it may be desirable to also take into account a situation where the total number of ACK/NACK and CSI bits that can be reported with satisfactory performance may be limited. In that case, combined reporting is enabled only up to a certain number of ACK/NACK bits. Thus, as shown at block 1170, the UE determines whether the number of ACK/NACK bits to be transmitted is less than or equal to a threshold value, L. If so, then ACK/NACK bits and CSI bits are reported simultaneously, using the new PUCCH mode, as shown at block 1180. If the number of ACK/NACK bits exceeds L, on the other hand, then the CSI bits may be dropped and the ACK/NACK bits transmitted, as shown at block 1190, using a configured PUCCH mode that does not supporting simultaneous CSI transmissions. The number L may be any suitable integer, but one non-limiting example is L=10. If the UE applies partial bundling, then the number of ACK/NACK bits to be transmitted and compared to L is the number of bits after bundling.

Figure 12:
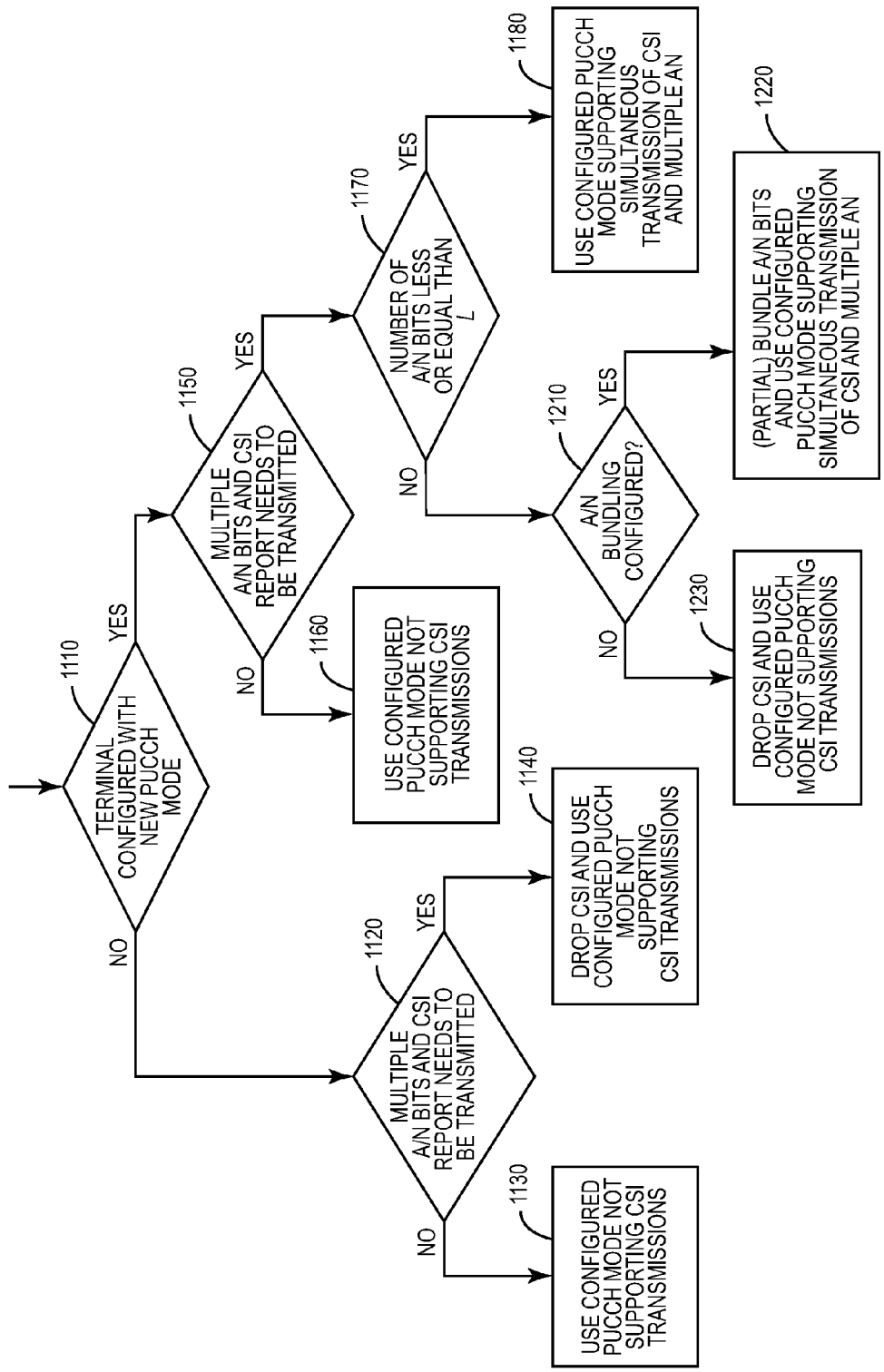

A flow chart in accordance with a second non-limiting example embodiment that includes bundling is shown in FIG. 12. Most of the flow chart is identical to that of FIG. 11. However, if multiple ACK/NACK bits and a CSI report are scheduled for transmission, and if the number of ACK/NACK bits for transmission is greater than L, then the mobile terminal determines whether ACK/NACK bundling is configured, as shown at block 1210. If so, then the ACK/NACK bits are bundled to produce L or fewer bits, as shown at block 1220. These bundled ACK/NACK bits are then transmitted together with CSI bits. If not, the CSI bits are dropped, and the ACK/NACK bits transmitted using a PUCCH mode that does not support simultaneous ACK/NACK and CSI transmission, as shown at block 1230.

Figure 13:
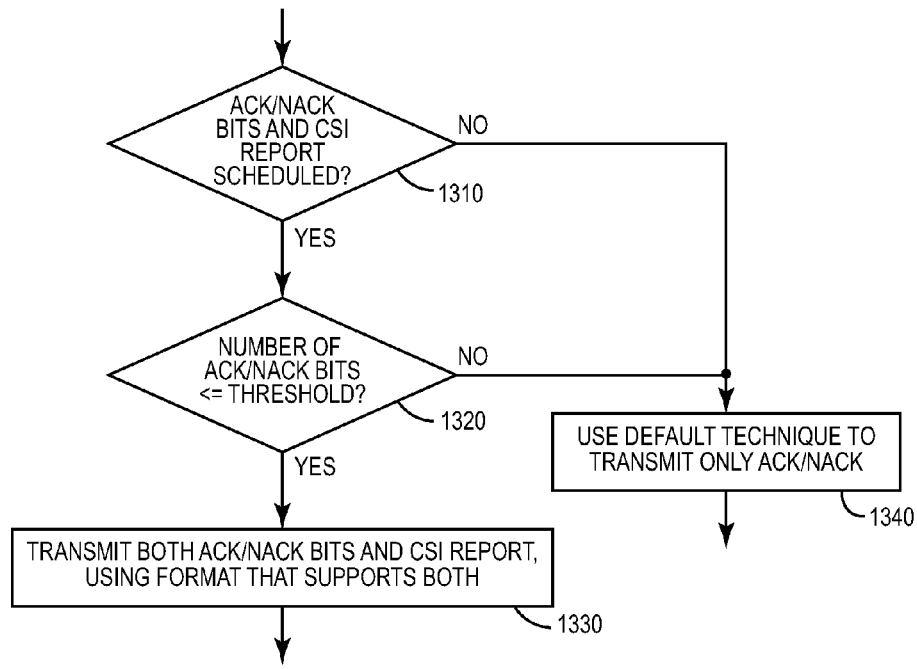

FIG. 13 is another process flow diagram that illustrates, more generally, a method for simultaneous reporting of channel-state information and hybrid-ARQ ACK/NACK information, suitable for implementation by a mobile terminal. Of course, the illustrated method should be understood within the context of mobile terminal processing in general, and in the context of forming and transmitting uplink control channel information, more particularly. The pictured method may be carried out as part of the processing carried out by a mobile terminal for each uplink subframe, for example.

As shown at block 1310, the method begins with determining whether channel-state information and hybrid-ARQ ACK/NACK bits corresponding to a plurality of downlink subframes or a plurality of downlink carriers, or both, are scheduled for transmission in a given uplink subframe. If not, then conventional techniques for transmitting only ACK/NACK bits may be used, as shown at block 1340. On the other hand, if there is a "collision" between a periodic CSI report and ACK/NACK bits, the method continues with an evaluation of whether the number of the first hybrid-ARQ ACK/NACK bits is less than or equal to a threshold number, as shown at block 1320. If not, conventional techniques for transmitting only ACK/NACK bits may be used, in some embodiments. If there are no more than a threshold number of ACK/NACK bits to transmit, however, the channel-state information and the hybrid-ARQ ACK/NACK bits are transmitted, as shown at block 1330, using physical control channel resources of the first uplink subframe.

In some embodiments, where ACK/NACK bundling is employed, the number of hybrid-ARQ ACK/NACK bits, which is compared to the threshold number, represents the number of ACK/NACK bits after ACK/NACK bundling. Further, in some embodiments the threshold number may vary, depending on the number of channel-state information bits scheduled for transmission. For embodiments where the threshold number is static, a suitable number might be 10, for example.

Several variants of the technique illustrated in FIG. 13 are possible. For example, as suggested by the flow diagram of FIG. 12, if the number of ACK/NACK bits scheduled for transmission is greater than the threshold, the number of bits may be reduced to a suitable number, e.g., by employing bundling. The bundled ACK/NACK bits may then be transmitted along with channel-state information bits, using a control channel format that supports both.

Any of a number of techniques for encoding the channel-state information and the hybrid-ARQ ACK/NACK bits can be used. In one embodiment, the hybrid-ARQ ACK/NACK bits are encoded with a first encoder and the channel-state information bits are encoded using a second encoder. The encoded and hybrid-ARQ ACK/NACK bits and the encoded channel-state information bits are interleaved before transmission. This approach allows the degree of error protection to be allocated between the hybrid-ARQ ACK/NACK bits and the channel-state information. Because faulty ACK/NACK data can cause unnecessary re-transmissions, it may be advantageous to provide more robust error protection to the hybrid-ARQ ACK/NACK bits, for example.

Figure 14:
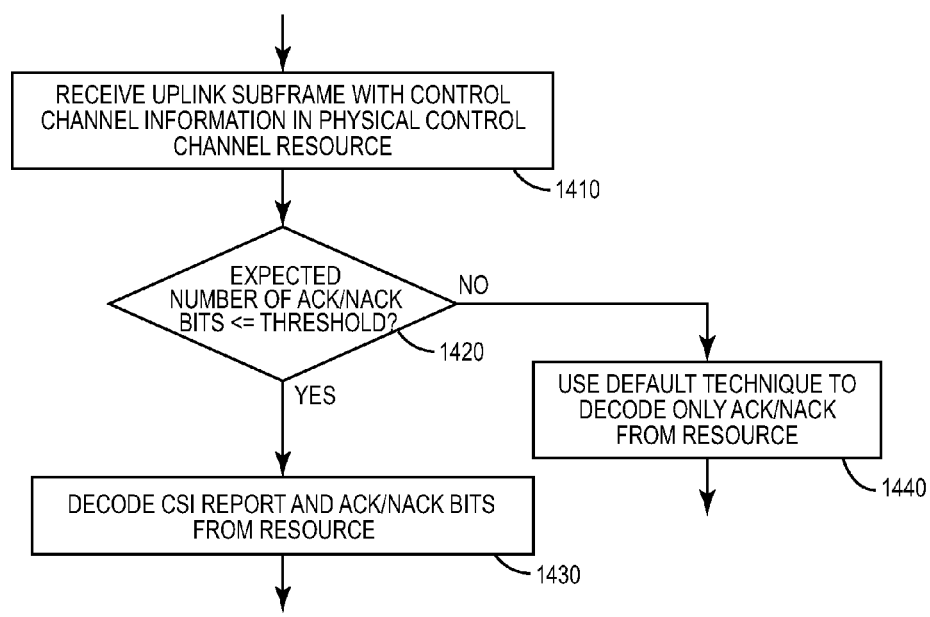
FIG. 14 is a process flow diagram illustrating an example method for receiving and decoding simultaneously reported channel-state information and hybrid-ARQ ACK/NACK bits.

FIG. 14 is a process flow illustrating a corresponding technique for handling uplink control channel that has been generated and transmitted according to the methods described above. The method illustrated in FIG. 14 might be implemented in a base station, for example, such as an LTE eNodeB. For a given subframe the method begins, as shown at block 1410, with the receiving of an uplink subframe that carries control channel information in one or several physical control channel resources. As shown at block 1420, the base station determines whether a number of expected hybrid-ARQ ACK/NACK bits is less than or equal to a threshold number. If so, the base station decodes both channel-state information and hybrid-ARQ ACK/NACK bits from each physical control channel resource for which the number of expected hybrid-ARQ ACK/NACK bits is less than or equal to the threshold number, as shown at block 1430. Otherwise, the base station uses conventional techniques to decode only ACK/NACK bits from the physical control channel resource, as shown at block 1440.

In some cases, the threshold number varies, depending on a number of expected channel-state information bits. In some embodiments, where ACK/NACK bundling is used, the decoding of the control channel information yields bundled hybrid-ARQ ACK/NACK bits, in which case the method further includes unbundling the bundled hybrid-ARQ ACK/NACK bits. In some systems, it may be the case that not all mobile terminals are configured for simultaneous reporting of channel-state information and hybrid-ARQ ACK/NACK information, even where they support the feature. Accordingly, the process pictured in FIG. 11 may be preceded, in some instances, by a determination that the mobile terminal of interest has been configured, via Radio Resource Control signaling, for simultaneous reporting according to the techniques described herein.

The functions in the flowcharts of FIGS. 11-13 may be implemented using electronic data processing circuitry provided in the mobile terminal. Likewise, the functions in the flowchart of FIG. 14 may be implemented using electronic data processing circuitry provided in a base station. Each mobile terminal and base station, of course, also includes suitable radio circuitry for receiving and transmitting radio signals formatted in accordance with known formats and protocols, e.g., LTE formats and protocols.

Figure 15:
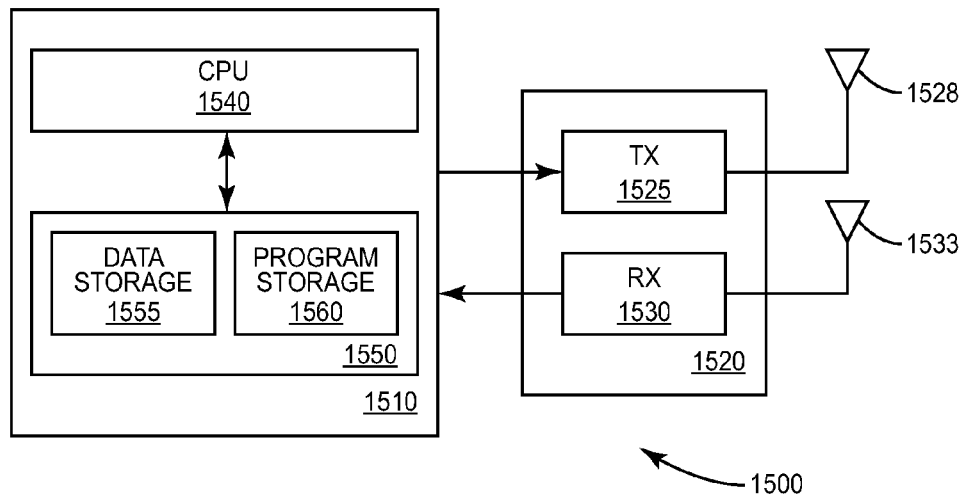
FIG. 15 is a block diagram illustrating components of an example communications node according to some embodiments of the invention.

FIG. 15 illustrates features of an example communications node 1500 according to several embodiments of the present invention. Although the detailed configuration, as well as features such as physical size, power requirements, etc., will vary, the general characteristics of the elements of communications node 1500 are common to both a wireless base station and a mobile terminal. Further, both may be adapted to carry out one or several of the techniques described above for encoding and transmitting ACK/NACK bits and channel-state information or decoding such information from a received signal.

Communications node 1500 comprises a transceiver 1520 for communicating with mobile terminals (in the case of a base station) or with one or more base stations (in the case of a mobile terminal) as well as a processing circuit 1510 for processing the signals transmitted and received by the transceiver 1520. Transceiver 1520 includes a transmitter 1525 coupled to one or more transmit antennas 1528 and receiver 1530 coupled to one or more receive antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 15, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one of the techniques described above encoding and transmitting ACK/NACK bits and channel-state information or decoding such information from a received signal. Of course, it will be appreciated that not all of the steps of these techniques are necessarily performed in a single microprocessor or even in a single module.

Figure 16:
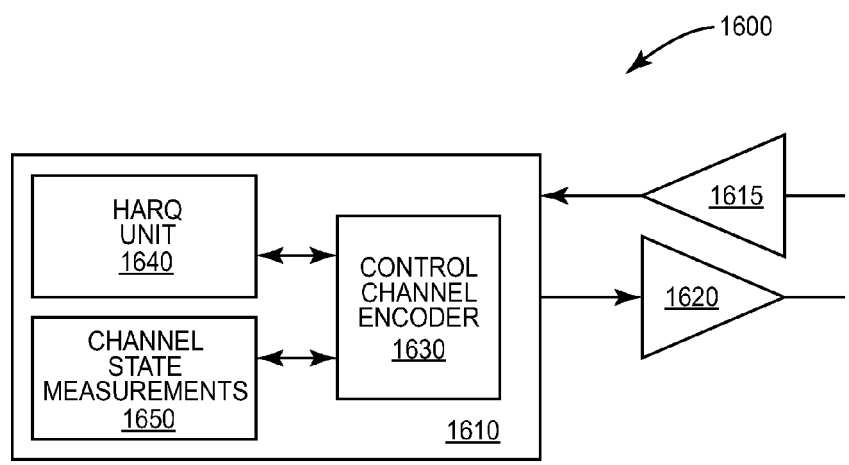
FIG. 16 illustrates functional components of an example mobile terminal.

FIG. 16 illustrates several functional elements of a mobile terminal 1600, adapted to carry out some of the techniques discussed in detail above. Mobile terminal 1600 includes a processing circuit 1610 configured to receive data from a base station, via receiver circuit 1615, and to construct a series of uplink subframes for transmission by transmitter circuit 1620. In several embodiments, processing circuit 1610, which may be constructed in the manner described for the processing circuits 1510 of FIG. 15, includes a hybrid-ARQ processing unit 1640, which is adapted to determine that first channel-state information (from channel-state measurement unit 1650) and first hybrid-ARQ ACK/NACK bits corresponding to a plurality of downlink subframes or a plurality of downlink carriers, or both, are scheduled for transmission in a first uplink subframe, and to determine whether the number of the first hybrid-ARQ ACK/NACK bits is less than or equal to a threshold number. Processing circuit 1610 further includes a channel state measurement unit 1650, which produces channel-state information (CSI) bits based on observations of the radio channel, and an uplink control channel encoding unit 1630, which is adapted to send both the first channel-state information and the first hybrid-ARQ ACK/NACK bits in physical control channel resources of the first uplink subframe, on a single carrier, in response to determining that the number of hybrid-ARQ ACK/NACK bits to be transmitted in the first uplink subframe is less than or equal to the threshold number. Of course, all of the variants of the techniques described above are equally applicable to mobile terminal 1600 as well.

Without changes to current 3GPP specifications, collisions between ACK/NACK transmissions and CSI reports will likely lead to dropped CSI reports. The novel techniques described herein enable simultaneous transmission of multiple ACK/NACK bits and CSI. With the use of these techniques, fewer CSI reports are dropped, which improves link adaptation and increases throughput.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method in a mobile terminal for simultaneous reporting of channel-state information and hybrid-ARQ ACK/NACK information in uplink subframes, the method comprising:
    determining, for a first uplink subframe, that channel-state information and hybrid-ARQ ACK/NACK bits corresponding to a plurality of downlink carriers are scheduled for transmission;
    determining that the number of the hybrid-ARQ ACK/NACK bits is less than or equal to a threshold number, wherein the number of the hybrid-ARQ ACK/NACK bits represents a number of ACK/NACK bits after ACK/NACK bundling; and
    transmitting both the channel-state information and the hybrid-ARQ ACK/NACK bits, after bundling, in physical control channel resources of the first uplink subframe, on a single carrier, in response to determining that the number of hybrid-ARQ ACK/NACK bits to be transmitted in the first uplink subframe is less than or equal to the threshold number.

2. The method of claim 1, wherein determining that the number of the hybrid-ARQ ACK/NACK bits is less than or equal to the threshold number is performed in response to determining that a number of hybrid-ARQ ACK/NACK bits for the plurality of downlink carriers, before bundling, is greater than the threshold number.

3. The method of claim 1, wherein the threshold number depends on the number of channel-state information bits scheduled for transmission in the first uplink subframe.

4. The method of claim 1, further comprising:
    determining, for a second uplink subframe, that channel-state information and hybrid-ARQ ACK/NACK bits corresponding to a plurality of downlink carriers are scheduled for transmission;
    determining that the number of the hybrid-ARQ ACK/NACK bits to be transmitted in the second uplink subframe, after bundling, is not less than or equal to the threshold number; and
    dropping the channel-state information and transmitting the hybrid-ARQ ACK/NACK bits scheduled for transmission in the second uplink subframe in physical control channel resources of the second uplink subframe, on a single carrier, in response to determining that the number of hybrid-ARQ ACK/NACK bits to be transmitted in the second uplink subframe, after bundling, is not less than or equal to the threshold number.

5. The method of claim 1, wherein the threshold number is 10.

6. The method of claim 1, wherein the hybrid-ARQ ACK/NACK bits and the channel-state information are transmitted using a Physical Uplink Control Channel (PUCCH) format 3 resource in a Long-Term Evolution (LTE) wireless system.

7. The method of claim 1, further comprising, before transmitting both the channel-state information and the bundled hybrid-ARQ ACK/NACK bits:
    encoding the bundled hybrid-ARQ ACK/NACK bits using a first encoder and separately encoding the channel-state information bits using a second encoder; and
    interleaving the encoded, bundled, hybrid-ARQ ACK/NACK bits and the encoded channel-state information bits.

8. A method in a base station for processing received reports of channel-state information and hybrid-ARQ ACK/NACK information, the method comprising:
    receiving a plurality of uplink subframes, each uplink subframe comprising one or more physical control channel resources carrying control channel information encoded by mobile terminals;
    for each of one or more of the physical control channel resources, determining whether a number of expected hybrid-ARQ ACK/NACK bits is less than or equal to a threshold number; and
    decoding both channel-state information and hybrid-ARQ ACK/NACK bits from each physical control channel resource for which the number of expected hybrid-ARQ ACK/NACK bits is less than or equal to the threshold number;
    decoding both channel-state information and bundled hybrid-ARQ ACK/NACK bits from each physical control channel resource for which the number of expected hybrid-ARQ ACK/NACK bits is not less than or equal to the threshold number but for which the number of expected hybrid-ARQ ACK/NACK bits, after bundling, is less than or equal to the threshold number; and
    decoding only hybrid-ARQ ACK/NACK bits from each physical control channel resource for which the number of expected hybrid-ARQ ACK/NACK bits, after bundling, is not less than or equal to the threshold number.

9. The method of claim 8, wherein the threshold number depends on a number of expected channel-state information bits.

10. The method of claim 8, wherein the threshold number is 10.

11. The method of claim 8, wherein decoding both channel-state information and hybrid-ARQ ACK/NACK bits comprises:
    de-interleaving encoded bits from the physical control channel resource, to obtain encoded hybrid-ARQ ACK/NACK bits and separate encoded channel-state information bits; and
    decoding the hybrid-ARQ ACK/NACK bits using a first decoder and separately decoding the channel-state information bits using a second decoder.

12. The method of claim 8, further comprising first determining that the mobile terminal has been configured, via Radio Resource Control signaling, for simultaneous reporting of channel-state information and hybrid-ARQ ACK/NACK information.

13. A mobile terminal configured for simultaneous reporting of channel-state information and hybrid-ARQ ACK/NACK information in uplink subframes, the mobile terminal comprising a receiver circuit, a transmitter circuit, and a processing circuit, wherein the processing circuit is adapted to:
    determine, for a first subframe, that channel-state information and hybrid-ARQ ACK/NACK bits corresponding to plurality of downlink carriers are scheduled for transmission;
    determine that the number of the hybrid-ARQ ACK/NACK bits is less than or equal to a threshold number, wherein the number of the hybrid-ARQ ACK/NACK bits represents a number of ACK/NACK bits after ACK/NACK bundling; and send both the channel-state information and the hybrid-ARQ ACK/NACK bits, after bundling, to a base station, via the transmitter circuit, in physical control channel resources of the first uplink subframe, on a single carrier, in response to determining that the number of hybrid-ARQ ACK/NACK bits to be transmitted in the first uplink subframe is less than or equal to the threshold number.

14. The mobile terminal of claim 13, wherein the processing circuit determines that the number of the hybrid-ARQ ACK/NACK bits is less than or equal to the threshold number in response to determining that a number of hybrid-ARQ ACK/NACK bits for the plurality of downlink carriers, before bundling, is greater than the threshold number.

15. The mobile terminal of claim 13, wherein the processing circuit is further adapted to:

determine, for a second uplink subframe, that channel-state information and hybrid-ARQ ACK/NACK bits corresponding to a plurality of downlink carriers are scheduled for transmission;

determine that the number of the hybrid-ARQ ACK/NACK bits, after bundling, to be transmitted in the second uplink subframe, is not less than or equal to the threshold number; and drop the channel-state information and send the hybrid-ARQ ACK/NACK bits scheduled for transmission in the second uplink subframe to the base station, via the transmitter circuit, in physical control channel resources of the second uplink subframe, on a single carrier, in response to determining that the number of hybrid-ARQ ACK/NACK bits to be transmitted in the second uplink subframe, after bundling, is not less than or equal to the threshold number.

16. The mobile terminal of claim 13, wherein the threshold number is 10.

17. The mobile terminal of claim 13, wherein the hybrid-ARQ ACK/NACK bits and the channel-state information are sent using a Physical Uplink Control Channel (PUCCH) format 3 resource in a Long-Term Evolution (LTE) wireless system.

18. The mobile terminal of claim 13, wherein the processing circuit is further adapted to, before sending both the channel-state information and the bundled hybrid-ARQ ACK/NACK bits to the base station:

encode the bundled hybrid-ARQ ACK/NACK bits using a first encoder and separately encoding the channel-state information bits using a second encoder; and interleave the encoded, bundled, hybrid-ARQ ACK/NACK bits and the encoded channel-state information bits.

19. A base station configured to process received reports of channel-state information and hybrid-ARQ ACK/NACK information, the base station comprising a transmitter circuit, a receiver circuit, and a processing circuit, wherein the processing circuit is configured to:

receive, via the receiver circuit a plurality of uplink subframes, each uplink subframe comprising one or more physical control channel resources carrying control channel information encoded by mobile terminals;

determine, for each of one or more of the physical control channel resources, whether a number of expected hybrid-ARQ ACK/NACK bits is less than or equal to a threshold number;

decode both channel-state information and hybrid-ARQ ACK/NACK bits from each physical control channel resource for which the number of expected hybrid-ARQ ACK/NACK bits is less than or equal to the threshold number;

decode both channel-state information and bundled hybrid-ARQ ACK/NACK bits from each physical control channel resource for which the number of expected hybrid-ARQ ACK/NACK bits is not less than or equal to the threshold number but for which the number of expected hybrid-ARQ ACK/NACK bits, after bundling, is less than or equal to the threshold number; and decode only hybrid-ARQ ACK/NACK bits from each physical control channel resource for which the number of expected hybrid-ARQ ACK/NACK bits, after bundling, is not less than or equal to the threshold number.

20. The base station of claim 19, wherein the threshold number is 10.

21. The base station of claim 19, wherein the processing circuit is adapted to decode both channel-state information and hybrid-ARQ ACK/NACK bits by:

de-interleaving encoded bits from the physical control channel resource, to obtain encoded hybrid-ARQ ACK/NACK bits and separate encoded channel-state information bits; and decoding the hybrid-ARQ ACK/NACK bits using a first decoder and separately decoding the channel-state information bits using a second decoder.

* * * * *

UNITED STATES PATENT AND TRADEMARK OFFICE
CERTIFICATE OF CORRECTION

Page 1 of 1

PATENT NO. : 9,191,162 B2
APPLICATION NO. : 14/459880
DATED : November 17, 2015
INVENTOR(S) : Baldemair et al.

It is certified that error appears in the above-identified patent and that said Letters Patent is hereby corrected as shown below:

On the title page, item (57), under "ABSTRACT", in Column 2, Line 5, delete "(first" and insert -- first --, therefor.

In the specification

In Column 1, Line 9, delete "2012," and insert -- 2012, now Pat. No. 8,837,410, --, therefor.

In the claims

In Column 20, Line 64, in Claim 13, delete "plurality" and insert -- a plurality --, therefor.

Signed and Sealed this
Twelfth Day of July, 2016

Michelle K. Lee
*Director of the United States Patent and Trademark Office*